(12) United States Patent
Wickholm

(10) Patent No.: US 7,633,624 B1
(45) Date of Patent: Dec. 15, 2009

(54) SELF COMPENSATING CUBE CORNER INTERFEROMETER

(75) Inventor: David Randall Wickholm, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 128 days.

(21) Appl. No.: 11/593,278

(22) Filed: Nov. 6, 2006

(51) Int. Cl.
G01B 9/02 (2006.01)
(52) U.S. Cl. ...................................... 356/450
(58) Field of Classification Search .................. 356/450, 356/451, 454, 519
See application file for complete search history.

(56) References Cited

U.S. PATENT DOCUMENTS

| | | | |
|---|---|---|---|
| 4,265,540 A * | 5/1981 | Doyle | 356/455 |
| 4,278,351 A * | 7/1981 | Breckinridge et al. | 356/455 |
| 4,932,780 A * | 6/1990 | Izumi | 356/451 |
| 5,155,551 A * | 10/1992 | Vidrine et al. | 356/455 |
| 5,847,828 A | 12/1998 | Downs | |
| 6,747,741 B1 * | 6/2004 | Kleinschmidt | 356/454 |
| 2004/0021872 A1 * | 2/2004 | Sandercock | 356/454 |

* cited by examiner

Primary Examiner—Tarifur Chowdhury
Assistant Examiner—Michael Lapage
(74) Attorney, Agent, or Firm—RatnerPrestia

(57) ABSTRACT

A Michelson interferometer has transversely arranged arms defining first and second transverse optical axes of the interferometer. The interferometer includes a beamsplitter for receiving an incoming ray, and transmitting an output ray. The beamsplitter is configured as an optical wedge. The first optical axis is terminated by a first cube corner retro-reflector, and the second optical axis is terminated by a second cube corner retro-reflector. The first and second cube corner retro-reflectors provide self compensation for chromatic aberration and anamorphism between the incoming ray and the output ray, and the transversely arranged arms are free-of any compensator.

10 Claims, 4 Drawing Sheets

US 7,633,624 B1

SELF COMPENSATING CUBE CORNER INTERFEROMETER

FIELD OF THE INVENTION

The present invention relates, in general, to an interferometer. More specifically, the present invention relates to a Michelson interferometer having cube corners as retro-reflectors which provide self compensation for chromatic aberration and anamorphism.

BACKGROUND OF THE INVENTION

Interferometers have become a central component in many remote sensing instruments. One such instrument is the Hyperspectral Interferometric Test Bed (HITB) sensor being developed by ITT Industries. The HITB sensor operates in the long wavelength infrared region (LWIR) and includes a compensated Michelson interferometer, an imaging telescope and a LWIR focal plane array (FPA). The Michelson interferometer uses retro-reflectors on an oscillating pendulum arm to provide a varying optical path difference between the two interferometer arms. The entire sensor is placed within a vacuum housing, where it is cooled to approximately 220° K. The HITB sensor views selected IR scenes through its vacuum window.

U.S. application Ser. No. 11/296,238 filed on Dec. 7, 2005, by the same inventor of the present application, describes an infrared interferometer that gives rise to etalons producing a rapidly oscillating pattern on the received scene energy. This oscillating pattern interferes with the desired scene energy and must be reduced or eliminated. In addition, very small changes in temperature of the interferometer causes significant changes in the internal optical path lengths that create the etalons. If changes in optical path length occur between calibrations of the interferometer, the transmission patterns of the etalons shift and result in radiometric errors.

Another problem described in U.S. application Ser. No. 11/296,238 is related to ghost images. Strong ghost images may result whenever two planar optical surfaces are in close proximity. Optical windows and beamsplitters commonly produce ghost images. For some applications there may be a maximum acceptable magnitude of ghost images. If the actual magnitude of a ghost image is found to exceed this maximum, the ghost magnitude must be reduced. Strategies for reducing ghost images include using high efficiency anti-reflection (AR) coatings where possible, wedging components to eliminate favorable etalon producing interference conditions, and choosing judiciously wedge and tilt angles so the ghost images are driven toward a wall away from the main image.

Wedging the interferometer plates greatly reduces the etalon transmission pattern. An IR ghost still exists, but the constructive interference from multiple reflections that gives rise to the etalon is reduced to small values. One conventional interferometer incorporates a 100 microradian wedge in its beamsplitter compensator. Another conventional interferometer incorporates a 1.2 milliradian wedge with an air wedge of 3.8 milliradians.

An example of a wedge is shown in FIG. 1. The figure depicts the output angles of ghost ray paths, when two surfaces are not parallel. As shown, wedge 10 includes two surfaces designated as 12 and 14. Path P1 and path P2 are primary image paths, and path T1 and path Rext are common ghost paths. The angular offsets of the ghost paths from the primary image paths are A3-A1 for the transmitted path and A2-A0 for the reflected path.

While wedges may reduce the etalon pattern, they cause other undesirable effects. The wedges may be large enough so that their chromatic aberration requires compensation in the optical system by including a window wedged in the opposite direction. This counter wedge may only partially reduce the aberration depending upon its location and tilt. Additionally, the components of the interferometer introduce anamorphic magnification.

U.S. application Ser. No. 11/296,238, which is incorporated herein by reference in its entirety, discloses ways of compensating a Michelson interferometer by using different types of compensators. One such compensator is shown herein in FIG. 2. As shown, Michelson interferometer 20 includes beamsplitter 22, compensator 24 and two flat retro-reflectors 25 and 26. The beamsplitter has two surfaces 22A and 22B, and the compensator has two surfaces (not labeled). As shown, the four surfaces are flat and parallel to each other. It will be understood, however, that these surfaces may be angled with respect to each other (thus forming wedges) and/or may be curved with respect to each other (thus forming surfaces having non-zero power).

In operation, incoming light (designated as input) enters beamsplitter 22, passing through input surface 22A. The passing light is split into first beam 27 and second beam 28, by beamsplitting surface 22B. The two beams 27 and 28 are shown in dashed and dotted lines, respectively. First beam 27 is reflected from beamsplitting surface 22B, whereas second beam 28 is transmitted through beamsplitting surface 22B.

Next, first beam 27 impinges upon and reflects from retro-reflector 25, thereby returning toward beamsplitter 22. The beam enters beamsplitter 22 at input surface 22A and exits beamsplitter 22 through beamsplitter surface 22B. The beam then enters and exits compensator 24 as an output beam.

Concurrently, second beam 28, after exiting beamsplitter 22 at beamsplitting surface 22B, enters and exits compensator 24. The second beam then impinges upon and reflects from retro-reflector 26, re-enters and re-exits compensator 24. Second beam 28 is next reflected from beamsplitting surface 22B of beamsplitter 22, again enters and exits the compensator, and finally arrives at the output, as shown. The two split beams 27 and 28 reunite and propagate approximately in the same direction, traveling toward an output detector (not shown) which detects the interference between the two beams.

A compensated Michelson interferometer, thus, has 4 opposing surfaces (2 surfaces of the beamsplitter and 2 surfaces of the compensator) resulting in 6 possible pairs of surfaces that may form etalons. These surfaces are typically wedged to reduce etalons. In addition, keeping the total radiometric error of a compensated interferometer below 1% requires keeping the temperature of the interferometer components constant to within a fraction of 1° K.

As will be explained, the present invention provides a Michelson interferometer that has advantages over conventional Michelson interferometers, because the interferometer of the present invention does not require compensation. As will be described, the present invention provides a Michelson interferometer having cube corners as retro-reflectors, where the cube corners provide self compensation for the interferometer.

SUMMARY OF THE INVENTION

To meet this and other needs, and in view of its purposes, the present invention provides a Michelson interferometer having transversely arranged arms. The arms define first and second transverse optical axes of the interferometer. The first of the optical axes includes an incoming ray and a transmitted ray and the second of the optical axes includes a reflected ray and an output ray disposed transversely to the incoming ray. The transmitted and reflected rays are each a portion of the incoming ray. The interferometer includes a beamsplitter for receiving the incoming ray, and transmitting the output ray, and the beamsplitter is configured as an optical wedge. The first optical axis is terminated by a first cube corner retro-reflector, and the second optical axis is terminated by a second cube corner retro-reflector. The first and second cube corner retro-reflectors provide self compensation for chromatic aberration and anamorphism between the incoming ray and the output ray, and the transversely arranged arms are free-of any compensator.

The beamsplitter includes two opposing surfaces forming a wedge angle sufficiently large to drive a ghost ray formed from the incoming ray away from the output ray. The wedge angle is between 0.01 degree and 1.0 degree. The first cube corner retro-reflector is configured to receive an image of the transmitted ray and invert the image of the transmitted ray prior to the beamsplitter transmitting the output ray. The first cube corner retro-reflector is in line with the transmitted ray for directing the transmitted ray back toward the beamsplitter. The second cube corner retro-reflector is configured to receive an image of the reflected ray and invert the image of the reflected ray prior to the beamsplitter transmitting the output ray. The second cube corner retro-reflector is in line with the reflected ray for directing the reflected ray back toward the beamsplitter.

The beamsplitter includes first and second opposing surfaces, where the first surface is disposed to receive the incoming ray before the second surface. The first surface includes an anti-reflection (AR) coating, and the second surface includes a nominally 50:50 beamsplitting coating.

Another embodiment of the present invention includes a Michelson interferometer having transversely arranged arms defining first an second optical axes terminating, respectively, in first and second retro-reflectors. The interferometer includes first and second cube corner retro-reflectors disposed, respectively, at ends of the first and second optical axes. A beamsplitter is included for receiving an incoming ray along the first optical axis, and (1) transmitting a first portion of the incoming ray along the first optical axis and (2) reflecting a second portion of the incoming ray along the second optical axis toward the second cube corner retro-reflector. The beamsplitter is configured as a first optical wedge having narrow and thick ends. A compensator is configured as a second optical wedge for (1) transmitting the first portion of the incoming ray along the first optical axis toward the first cube corner retro-reflector and (2) transmitting combined first and second portions of the incoming ray, as an output ray, along the second optical axis. The compensator is also configured as a second optical wedge having narrow and thick ends. The first and second cube corner retro-reflectors provide self compensation for chromatic aberration and anamorphism between the incoming ray and the output ray. The narrow ends of the beamsplitter and compensator are disposed closer to each other than the thick ends of the beamsplitter and compensator. The first and second optical axes includes only the first and second optical wedges and are free-of other optical wedges.

The first optical wedge of the beamsplitter and the second optical wedge of the compensator form a combined wedge angle sufficiently large to drive a ghost ray formed from the incoming ray away from the output ray and away from an output port of the interferometer. The first cube corner retro-reflector is configured to receive an image of the first portion of the incoming ray, along the first optical axis, and invert the image prior to the compensator transmitting the output ray, along the second optical axis. The first cube corner retro-reflector is in line with the first portion of the incoming ray for directing the first portion of the incoming ray back toward the compensator. The second cube corner retro-reflector is configured to receive an image of the reflected second portion of the incoming ray, along the second optical axis, and invert the image of the reflected second portion of the incoming ray prior to the compensator transmitting the output ray, along the second optical axis. The second cube corner retro-reflector is in line with the reflected second portion of the incoming ray for directing the reflected second portion of the incoming ray back toward the beamsplitter.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention provides an uncompensated Michelson interferometer. Such an interferometer has a single beamsplitting element and no compensating element. One side of the beamsplitter has an antireflection (AR) coating, while the other side of the beamsplitter has a nominally 50:50 beamsplitting coating. The Michelson interferometer of the present invention offers many advantages because it does not require a compensator. For example, (1) cost is significantly reduced, (2) alignment complexity is reduced and (3) transmission intensity is increased. The following is a discussion of the advantages of an uncompensated interferometer.

A compensation element, which is required to equalize the optical "in glass" path length of a conventional interferometer, absorbs heavily in the useful portion of the LWIR spectrum at wavelengths greater than 14 microns. The compensating element has two air-glass interfaces that must be antireflection (AR) is coated. These two surfaces of the compensation element, along with two surfaces of the beamsplitter, form an extensive family of ghost reflections that degrade the radiometric accuracy of the interferometric sensor. Without the compensation element, however, there remain only two air-glass interfaces that may create ghost images. Thus, the number of ghosts to be managed is greatly reduced without the compensation element in the optical path, and the radiometric accuracy is increased accordingly.

When the beamsplitter and compensator elements are both used, each element must be wedged to defeat channel spectra (etaloning). Too small a wedge produces an etalon that imprints a varying transmission pattern on top of the sensor desired spectral response. Too large a wedge, on the other hand, produces chromatic aberration that must be compensated elsewhere. Large wedges also produce anamorphic distortion that may be unacceptable. Generally, but not always, the compensating element must be nearly identical in thickness and in wedge angle to the beamsplitting element. In addition, compensating elements with large wedges require precise alignment to each other. Both, precise alignment and manufacturing concerns regarding matched wedge components, increase cost.

A compensated Michelson interferometer has a very large AC signal (center burst) at its zero path difference (ZPD) position. This requires a detector with sufficient dynamic range to take advantage of the NEDN of a Fourier Transform Interferometric Sensor (FTIS). Without the compensator element, on the other hand, the large AC center burst is significantly reduced, in some cases by as much as a factor of 30. This reduction in the AC center burst, in turn, reduces the required is dynamic range and leads to improved FTIS noise equivalent delta radiance (NEDN).

Figure 1:
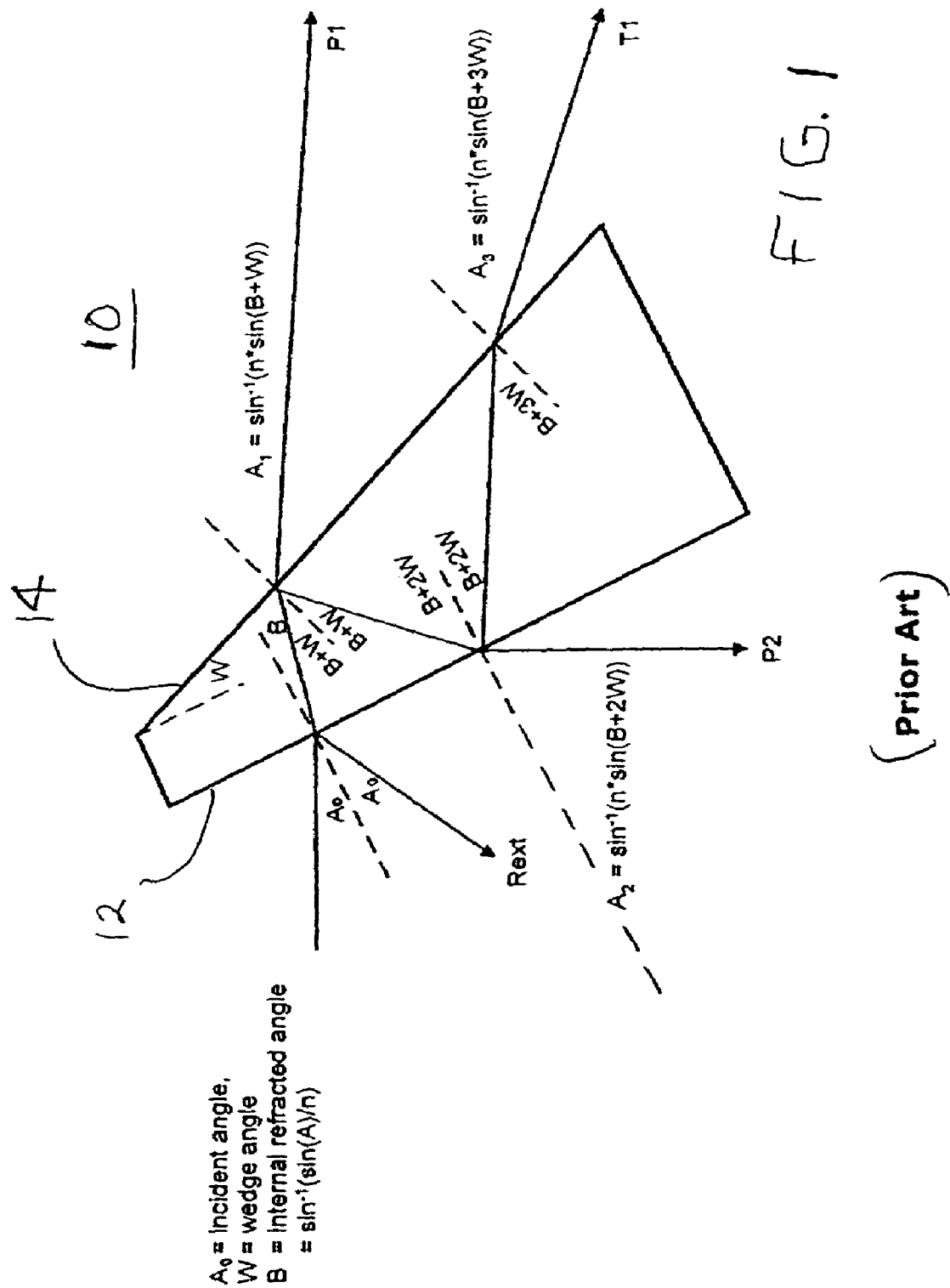
FIG. 1 shows a beam of light traversing a wedge, illustrating the geometry of primary paths of the light and ghost paths of the light.
Figure 3:
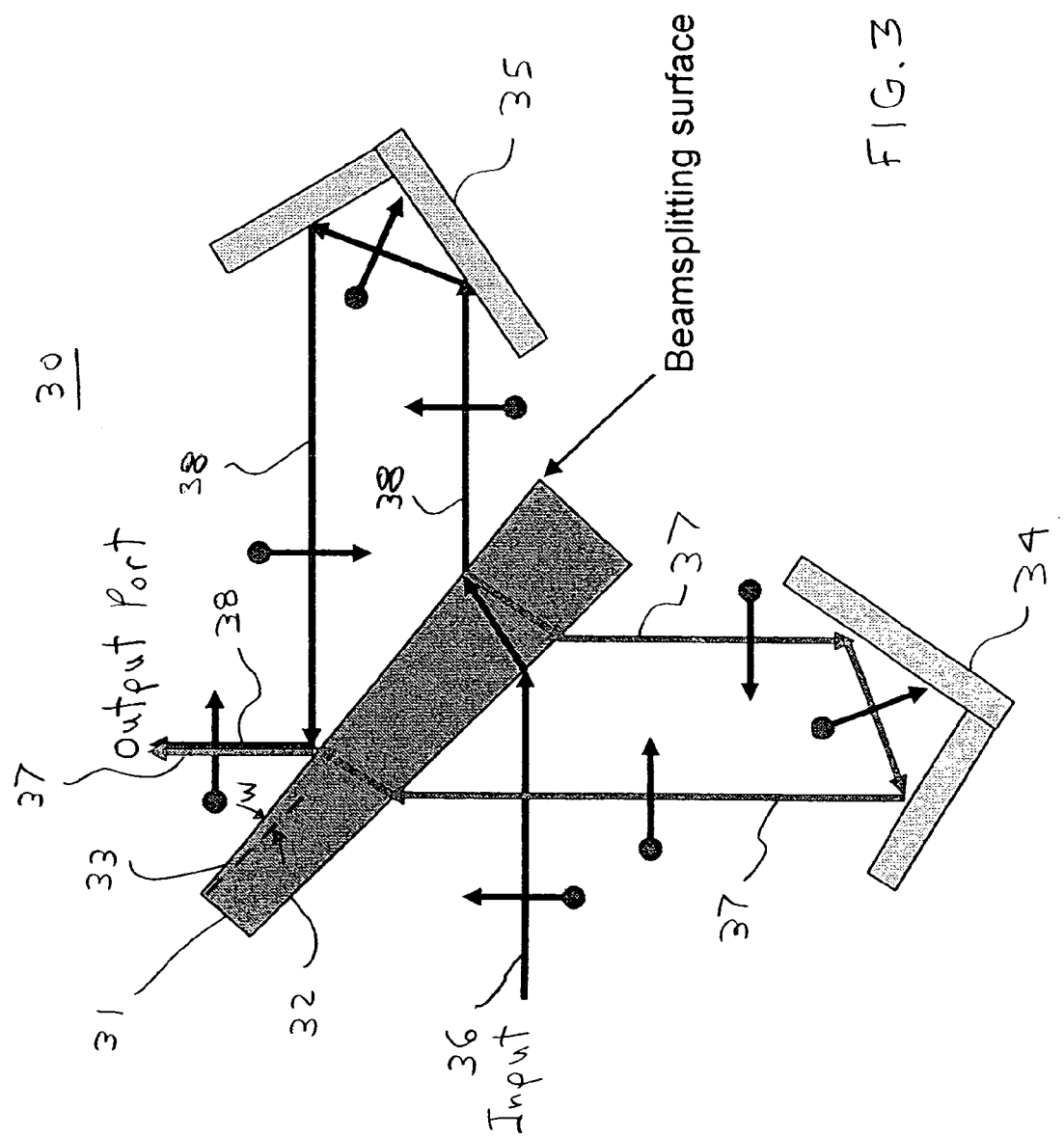
FIG. 3 shows a beam of light traversing a wedged beamsplitter of a Michelson interferometer having cube corner retro-reflectors, in accordance with an embodiment of the present invention.

Referring to FIG. 3, there is shown one embodiment of the present invention. As shown, a Michelson interferometer, generally designated as 30, includes beamsplitter 31 and two cube corner retro-reflectors, generally designated as 34 and 35. Beamsplitter 31 includes two surfaces, namely surface 32 and surface 33. Surface 32 includes an AR coating and surface 33, which is the beamsplitting surface, includes a nominally 50:50 beamsplitting coating. Beamsplitter 31 has surfaces 32 and 33 angled with respect to each other, thereby forming a wedge having an angle of W, as shown. The geometry of the paths traversed by the incoming ray resulting from wedged beamsplitter 31 is similar to the geometry traversed by the incoming ray (incident ray) resulting from wedge 10 shown in greater detail in FIG. 1.

The beamsplitter 31, because it is wedged, eliminates any channel spectral issues and any associated calibration requirements due to these channel spectral issues. If the wedge of the beamsplitter is large enough, beamsplitter 31 may be used to drive the ghost reflections toward a wall or toward any thermally stable feature within interferometer 30, thereby eliminating otherwise problematic out-of-field scene radiances.

Figure 2:
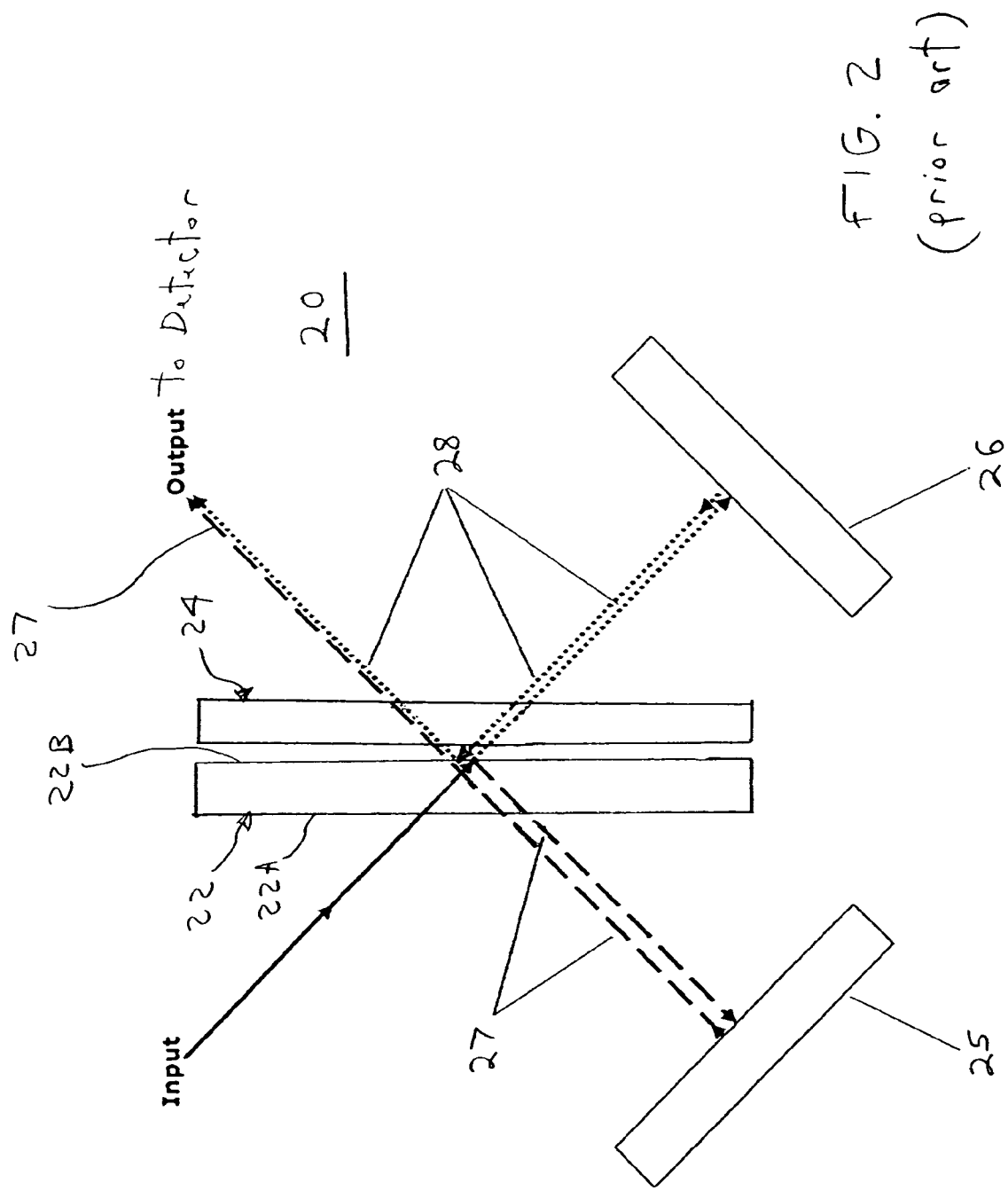
FIG. 2 shows a beam of light traversing a Michelson interferometer having flat retro-reflectors.

The applicant of the present invention discovered that cube corner retro-reflectors, similar to cube corner retro-reflectors 34 and 35, have substantial advantages over flat mirror retro-reflectors (such as flat mirror retro-reflectors 25 and 26 shown in FIG. 2). As will be explained, cube corner retro-reflectors 34 and 35 form an image inversion midway between the three passages of the input image through beamsplitter 31. The image inversion has the effect of flipping the apparent sign of the wedge angle of the beamsplitter. Thus, the incoming light ray automatically experiences compensating chromatic and anamorphic aberrations as the light ray traverses the interferometer. The incoming light ray exits the interferometer without any aberrations due to the beamsplitter wedge, regardless of the size of the wedge.

Similar to interferometer 20 (FIG. 2), interferometer 30 (FIG. 3) has orthogonally arranged arms. It will be appreciated, however, that these interferometers need not have arms that are orthogonal to each other. These arms may be arranged at an angle other than 90 degrees. Accordingly, the arms of interferometer 30 (or 40 in FIG. 4) define first and second transverse optical axes, which may or may not be orthogonal to each other.

In operation, input ray 36 enters interferometer 30 and beamsplitter 31 by way of surface 32. Input ray 36 is then split by way of beamsplitting surface 33 into two rays, designated as ray 37 and ray 38. The ray 38 enters and exits cube corner retro-reflector 35, as shown. It will be observed that cube corner retro-reflector 35 performs an image inversion. The now inverted ray 38 impinges upon and reflects from beamsplitting surface 33, thereby radiating toward the output of interferometer 30.

Second ray 37, on the other hand, is reflected, from beamsplitting surface 33 toward surface 32. From surface 32, second ray 37 enters and exits cube corner retro-reflector 34, as shown. Similar to cube corner retro-reflector 35, cube corner retro-reflector 34 inverts the image of ray 37. The now inverted image of ray 37 enters beamsplitter 31 by way of surface 32 and exits beamsplitter 31 by way of beamsplitting surface 33. The first ray 38 and the second ray 37 combine on their path toward the output of interferometer 30.

As shown in FIG. 3, input ray 36 passes three times through beamsplitter 31 (once as ray 38 and twice as ray 37). The third passage occurs after ray 37 impinges upon and reflects from cube corner retro-reflector 34. This third passage compensates for one of the first two passages experienced by ray 36, 37. This leaves only a single uncompensated passage. On the other hand, ray 36, 38 experiences only one passage through the wedge before impinging upon cube corner retro-reflector 35. No compensation occurs for this single passage.

As discovered by the inventor, the embodiment shown in FIG. 3 is partially self compensating. Two wedge passages occur before the cube corner retro-reflector and one passage occurs after the cube corner retro-reflector. Since cube corner retro-reflector 34 performs an image inversion, ray 37 entering the wedge during the third and final passage sees a wedge of opposite sign to that of the previous passage by ray 37. This compensates the chromatic and anamorphic aberration of one of the two initial passages through beamsplitter 31. The final result is that ray 37 has a residual aberration of a single wedge passage.

The aberrational content of ray 38 is identical to the aberrational content of ray 37. In addition, the aberrational content of both rays are identical regardless of the magnitude of the wedge angle W. Therefore, there is no difference in wavefront tilt between output ray 37 and output ray 38. The dispersion of the wedge is wavelength dependent, but each ray sees the same beam deviation. A single correcting wedge of opposite sign may be inserted downstream (not shown) to correct the chromatic aberration common to both ray 37 and ray 38.

It will be understood that if flat mirrors, such as mirrors 25 and 26 shown in FIG. 2, were used in place of cube corner retro-reflectors 34 and 35 shown in FIG. 3, this embodiment would not work. The ray 37 would see three times the chromatic aberration seen by ray 38. The wavefront tilt between ray 37 and ray 38 could be set to zero for one wavelength only. All other wavelengths would show a wavefront tilt between the two rays. The wavefront tilt would increase as the difference between the wavelength under consideration and the wavelength at zero tilt increases.

The present invention eliminates the channel spectra found in a conventional interferometer by departing from two parallel surfaces and eliminating the penalty of a varying wavefront tilt. The presence of channel spectra makes the output signal amplitude of the interferometer very sensitive to small changes in the beamsplitter temperature. Any temperature change results in the index and the thickness of the beamsplitter to sufficiently change and cause the etalon transmission pattern to shift in wavelength. This, in turn, changes the signal amplitude and requires frequent frequency calibration, a stable temperature housing, or a combination of these two. With the etalon eliminated, the requirement for frequent frequency calibration and/or very stable temperatures is not necessary.

Furthermore, by sufficiently increasing the tilt angle (W) to drive the reflected ghost out of the detector's field-of-view (not shown) and onto a thermally stable surface (not shown), the embodiment of the present invention eliminates out-of-field radiances that may result from contamination of weak signals. Elimination of these out-of-field radiances may not be possible when flat mirror retro-reflectors are used.

It will be appreciated that in a conventional interferometer not using a compensator, a wedge may be used. Such wedge, however, is limited to a very small wedge angle, that is, the wedge angle is smaller than 0.01 degree. The present invention, however, may use wedges having wedge angles that are greater than 0.01 degree. In fact, wedge angles as large as 1.0 degree may also be used. Such large wedge angles become possible, because of the invention's use of cube corner retro-reflectors.

With the channel spectra eliminated and the ghosts stabilized, the present invention has further advantages. The present invention produces a small AC signal in the center burst, which reduces the required dynamic range of the detectors by as much as 30 times. (The scene DC signal from the detector may need to be blocked by using a high pass filter or some other type of DC clamp circuit.) Other noise susceptibilities are also reduced by the same factor. These include EMI susceptibility, FPA noise, A/D converter noise, and other noise associated with the analog electronics located between the FPA and the A/D converter.

Temperature stability remains an issue with regard to wavelength dispersion, because the glass portion of the optical path (namely, beamsplitter 31 and any other glass in the path of rays 36, 37 and 38) is 3n*t in one path, while the other path has a wavelength dispersion of simply n*t. A change in substrate index, n, and/or thickness, t, varies the optical path length difference between the two interferometer arms and, consequently, the wavelength delay when the rays are recombined upon passage to the output window.

Figure 4:
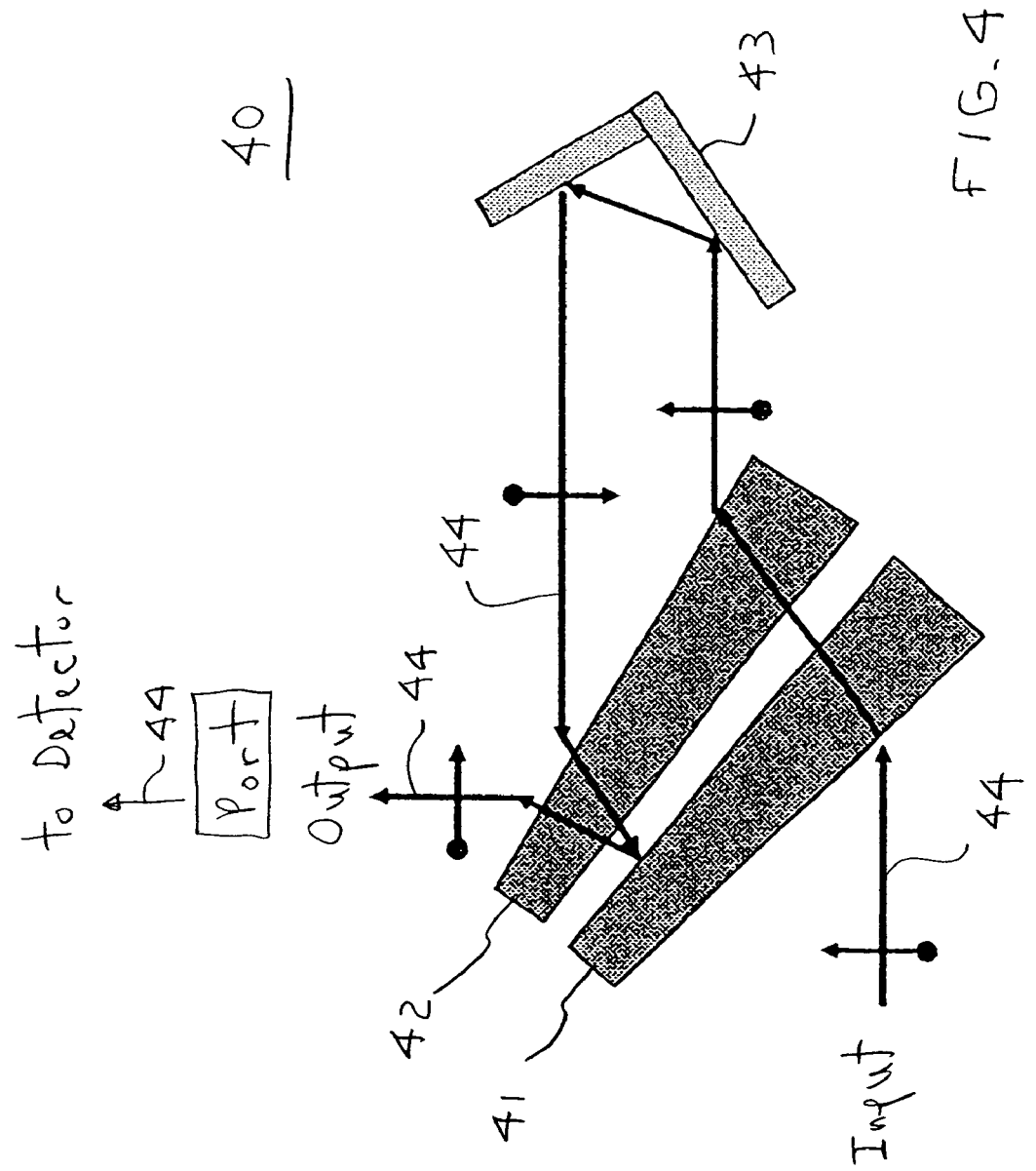
FIG. 4 shows a beam of light traversing a wedged beamsplitter and a wedged compensator of a Michelson interferometer having cube corner retro-reflectors, in accordance with another embodiment of the present invention.

Referring now to FIG. 4, there is shown another embodiment of the present invention. As shown, interferometer 40 includes beamsplitter 41 and compensator 42. Also included in interferometer 40 are two cube corner retro-reflectors. Only one cube corner retro-reflector 43 is shown in FIG. 4. The other cube corner retro-reflector has been omitted for clarity. As shown, interferometer 40 includes two wedges, a first wedge implemented in beamsplitter 41 and a second wedge implemented in compensator 42. Thus, incoming ray 44 sees two wedges before impinging upon cube corner retro-reflector 43. The outgoing ray 44 also sees two wedges after being reflected from cube corner retro-reflector 43. These two wedges have large wedge angles of W, in order to drive the ghosts away from the telescope field-of-view (not shown). By driving the ghosts away from the pupil of the telescope, the ghosts are not superimposed upon the primary image. Advantageously in the present invention, driving the ghosts into the stop wall of the telescope is accomplished without concern regarding chromatic aberration or anamorphism ruining the imagery of incoming ray 44.

It will be understood that small wedges in interferometer 40 would produce an etalon with an oscillatory transmission pattern which would be superimposed on the scene flux (the channel spectra). Large wedges, however, would introduce significant chromatic aberrations which would require compensation elsewhere in the interferometer. In addition, large wedges would create anamorphic image magnification which would cause nominally square IFOV to become rectangular. In addition, large wedge angles would produce ghost images which are offset from the intended scene IFOV. A ghost from a warm scene may overlay the primary image of a cool scene, thereby causing radiometric error. All these aforementioned problems are eliminated or minimized by use of two cube corner retro-reflectors in interferometer 40 of the present invention.

The cube corner retro-reflectors make interferometer 40 much easier to use. Cube corner retro-reflectors (one shown in FIG. 4) are not only insensitive to tilt of the wedges but are also self compensating with regard to aberrations normally associated with wedged plates, such as beamsplitter 41 and/or compensator 42. Because the cube corner retro-reflectors are image inverters, interferometer 40 becomes self compensating with respect to aberrations which are normally associated with such wedged plates.

In operation, incoming ray 44 passes through beamsplitter 41 and compensator 42. Ray 44 then impinges upon and is reflected from cube corner retroreflector 43, as shown. The image of incoming ray 44 is inverted, when ray 44 is reflected from cube corner retro-reflector 43. The now inverted image of ray 44 passes through compensator 42 and is reflected from the surface of beamsplitter 41 back toward compensator 42. The still inverted image of ray 44 passes a second time through compensator 42 and is then outputted from interferometer 40.

Accordingly, image inversion of ray 44 occurs midway between the four passages through beamsplitter 41 and compensator 42. Stated differently, image inversion occurs after two passages before ray 44 impinges upon cube corner retro-reflector 43, and before two passages after being reflected from cube corner retro-reflector 43. Thus, ray 44 experiences automatic compensating chromatic and anamorphic aberration, as it traverses and exits the interferometer without any aberration due to the respective wedges of the beamsplitter and compensator. This automatic compensation is true regardless of the size of the wedges.

The other ray (not shown) is split by the beamsplitting surface of beamsplitter 41 and experiences similar compensation for chromatic and anamorphic aberrations, because this split ray traverses the interferometer and exits the interferometer without any aberrations due to the wedges (this operation is similar to ray 37 shown in FIG. 3).

Because of the self compensating characteristics of interferometer 40 when using cube corner retro-reflectors, relatively large wedge angles (large angle W) may be used. Etalon effects are negligible with these large wedges. In addition, chromatic and anamorphic aberrations are automatically corrected. The wedges, namely beamsplitter 41 and compensator 42 need to be sufficiently large so that they drive the ghosts into a stable temperature surface and away from the pupil of the telescope. One such stable temperature surface may be a fore-optic telescope field-stop (not shown).

As an example, one way of eliminating calibration problems regarding ghosts images in interferometer 40 (or interferometer 30) is to use large wedges (0.01 to 1 degree or even greater). These large wedges are sufficient to drive the ghost reflections into thermally stable walls. While these large wedges create large amounts of chromatic aberrations and unacceptably large anamorphic distortion when using flat mirror retro-reflectors, the cube corner retro-reflectors of the present invention create self compensating features that cancel both aberrations. In summary, interferometer 40 (or interferometer 30) uses large wedges, without the conventional penalty of creating large chromatic aberrations and larger anamorphic distortions. The two cube corner retro-reflectors used in interferometer 40 (or interferometer 30) corrects these aberrations almost completely.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A Michelson interferometer having transversely arranged arms defining first and second optical axes terminating, respectively, in first and second retro-reflectors, the interferometer comprising:

first and second cube corner retro-reflectors disposed, respectively, at ends of the first and second optical axes, a beamsplitter for receiving an incoming ray along the first optical axis, and (1) transmitting a first portion of the incoming ray along the first optical axis and (2) reflecting a second portion of the incoming ray along the second optical axis toward the second cube corner retro-reflector, and the beamsplitter configured as a first optical wedge having narrow and thick ends, a compensator configured as a second optical wedge for (1) transmitting the first portion of the incoming ray along the first optical axis toward the first cube corner retro-reflector and (2) transmitting combined first and second portions of the incoming ray, as an output ray, along the second optical axis, and the compensator configured as a second optical wedge having narrow and thick ends, wherein the first and second cube corner retro-reflectors provide self compensation for chromatic aberration and anamorphism between the incoming ray and the output ray, the narrow ends of the beamsplitter and compensator are disposed closer to each other than the thick ends of the beamsplitter and compensator, and a length dimension of the beamsplitter and a length dimension of the compensator are oriented to substantially face each other, where the length dimension is transverse to the narrow and thick ends.

2. The interferometer of claim 1 wherein
   the first and second optical axes include only the first and second optical wedges and are free-of other optical wedges.

3. The interferometer of claim 1 wherein
   the first optical wedge of the beamsplitter and the second optical wedge of the compensator form a combined wedge angle sufficiently large to drive a ghost ray formed from the incoming ray away from the output ray and away from an output port of the interferometer.

4. The interferometer of claim 3 wherein
   the combined wedge angle is at least 0.01 degree.

5. The interferometer of claim 3 wherein
   the combined wedge angle is between 0.01 degree and 1.0 degree.

6. The interferometer of claim 1 wherein
   the first cube corner retro-reflector is configured to receive an image of the first portion of the incoming ray, along the first optical axis, and invert the image prior to the compensator transmitting the output ray, along the second optical axis.

7. The interferometer of claim 6 wherein
   the first cube corner retro-reflector is in line with the first portion of the incoming ray for directing the first portion of the incoming ray back toward the compensator.

8. The interferometer of claim 1 wherein
   the second cube corner retro-reflector is configured to receive an image of the reflected second portion of the incoming ray, along the second optical axis, and invert the image of the reflected second portion of the incoming ray prior to the compensator transmitting the output ray, along the second optical axis.

9. The interferometer of claim 8 wherein
   the second cube corner retro-reflector is in line with the reflected second portion of the incoming ray for directing the reflected second portion of the incoming ray back toward the beamsplitter.

10. The interferometer of claim 1 wherein
    the beamsplitter includes first and second opposing surfaces, the first surface disposed to receive the incoming ray before the second surface,
    the first surface includes an anti-reflection (AR) coating, and
    the second surface includes a nominally 50:50 beamsplitting coating.

* * * * *